Nov. 24, 1936.   C. W. SPOHR   2,061,856
TEMPERATURE CONTROLLED VEHICLE
Filed Dec. 5, 1932   6 Sheets-Sheet 3
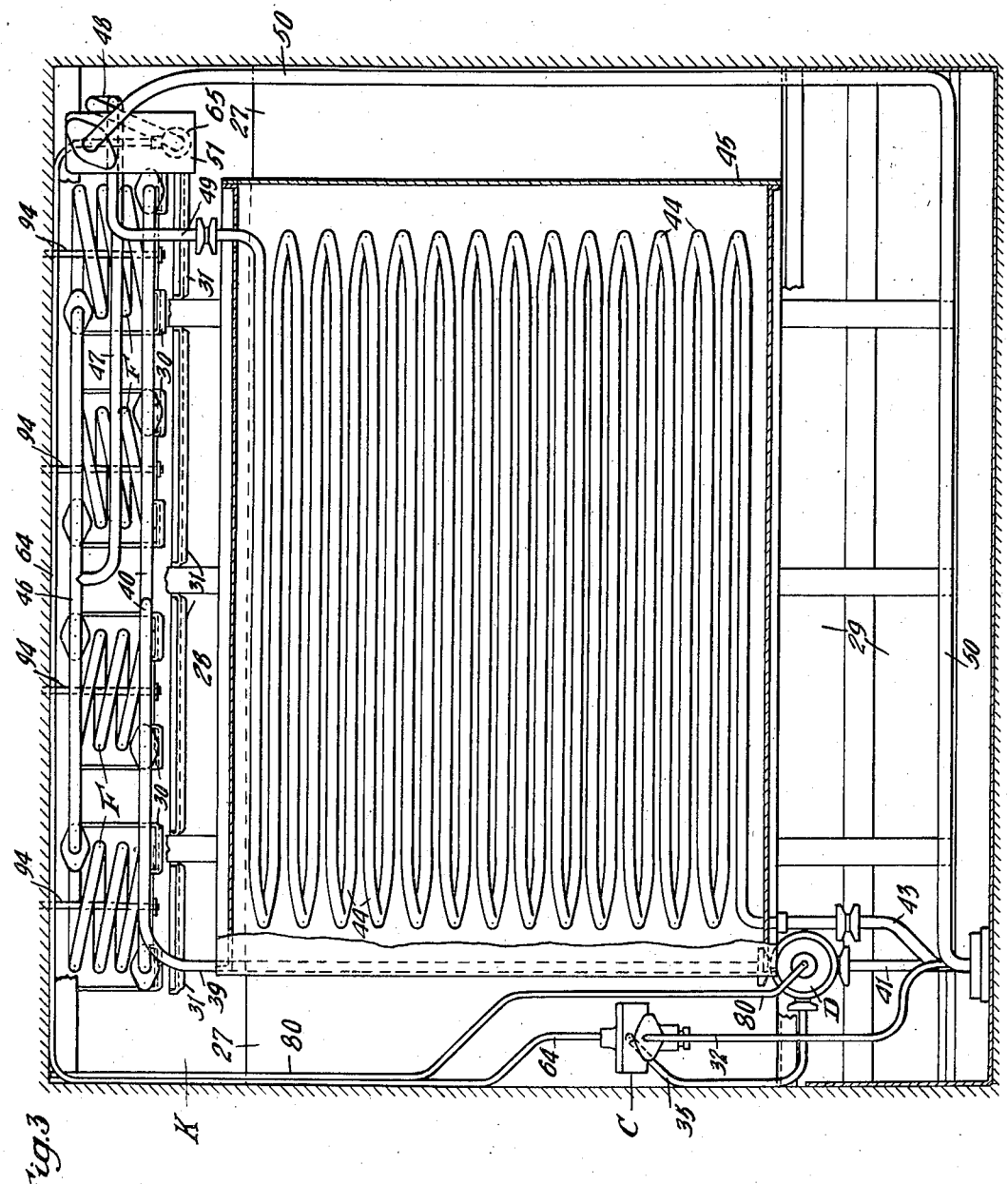
Inventor
Carl W. Spohr
By Joseph Harris
His Atty.

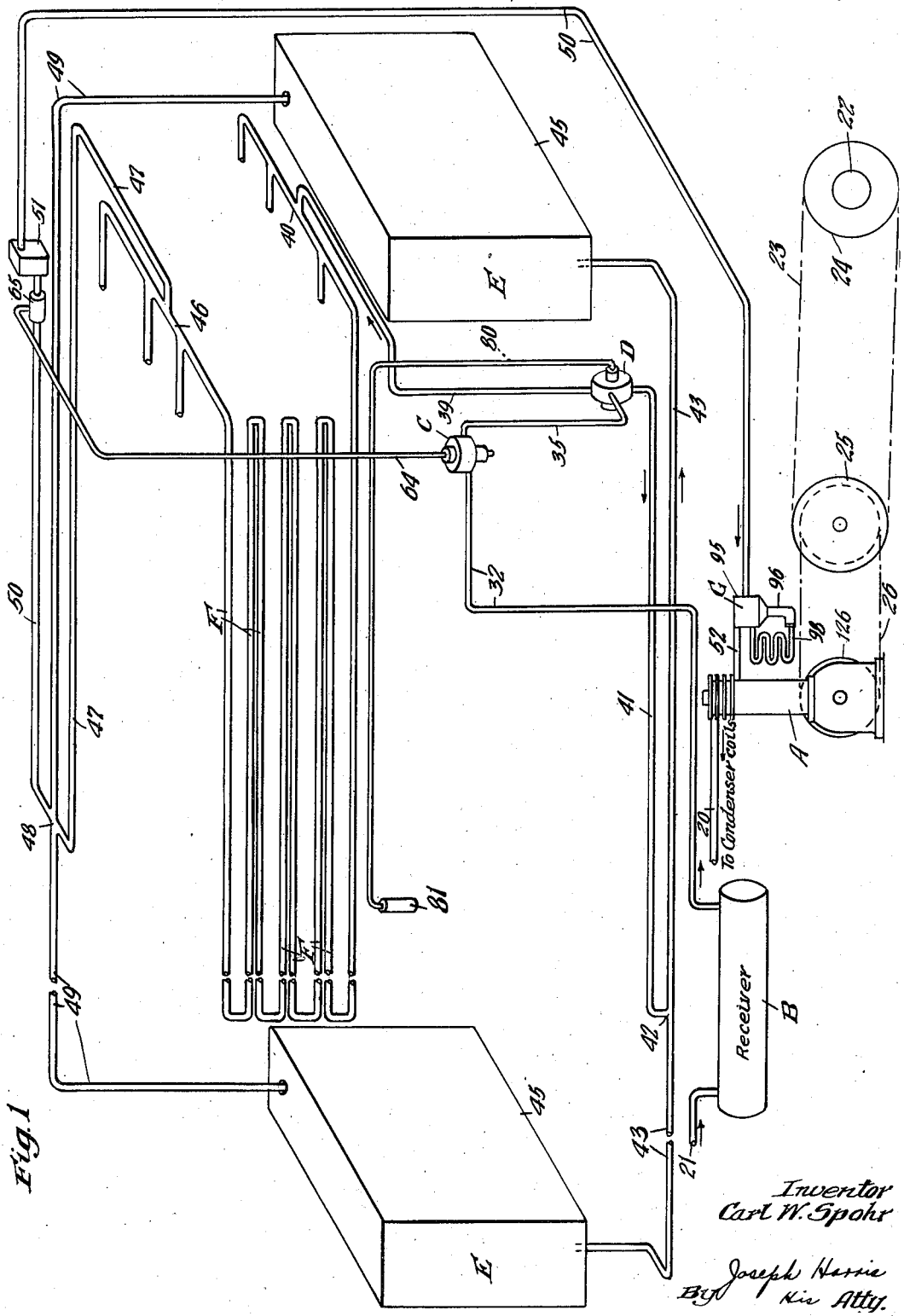

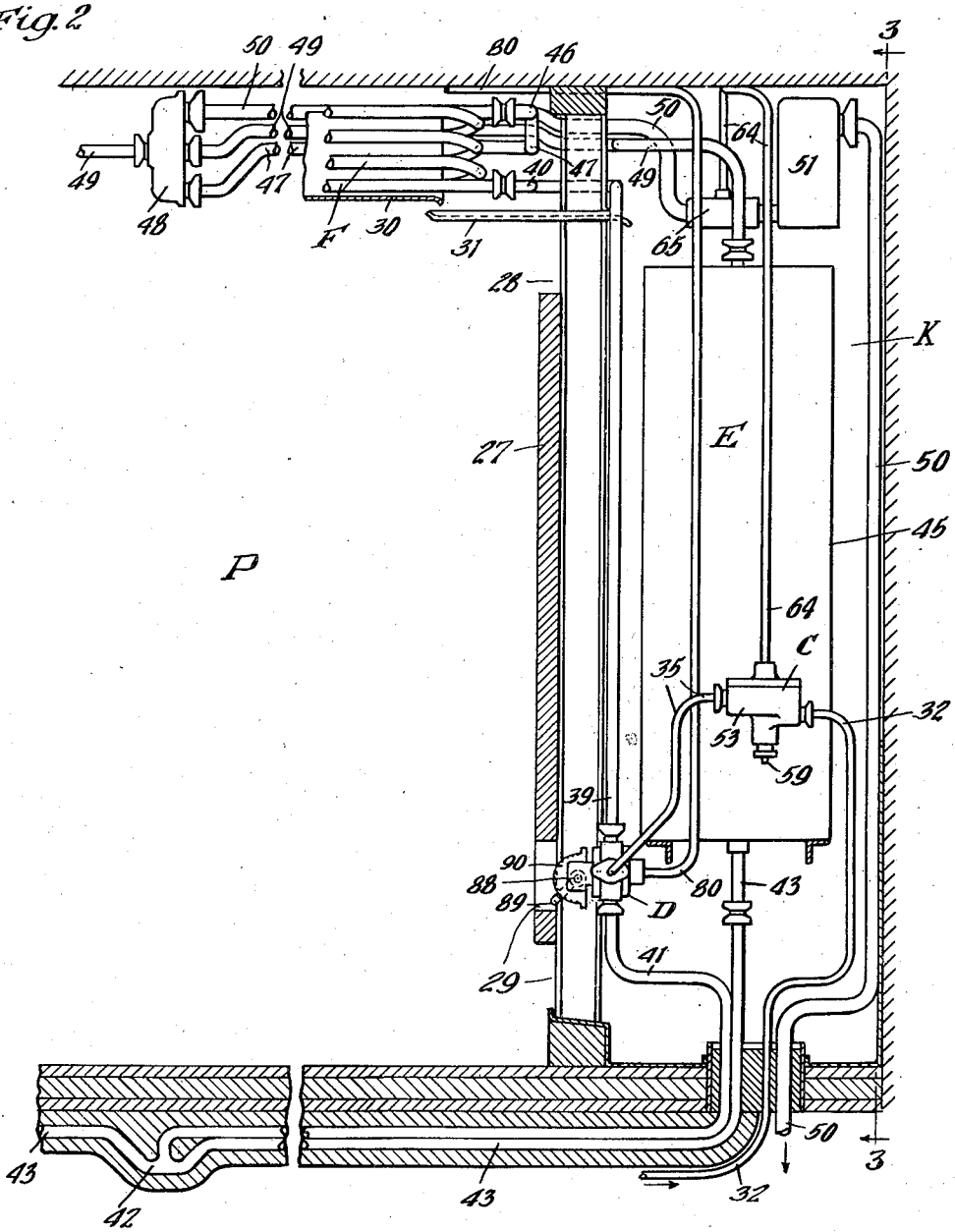

Nov. 24, 1936.  C. W. SPOHR  2,061,856
TEMPERATURE CONTROLLED VEHICLE
Filed Dec. 5, 1932   6 Sheets-Sheet 4
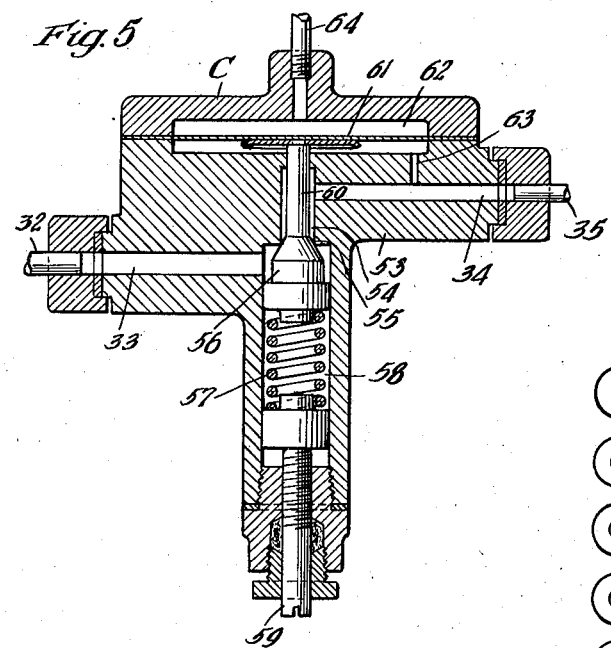
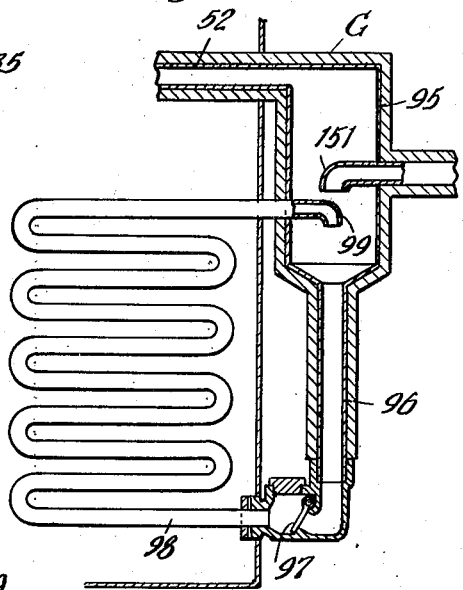
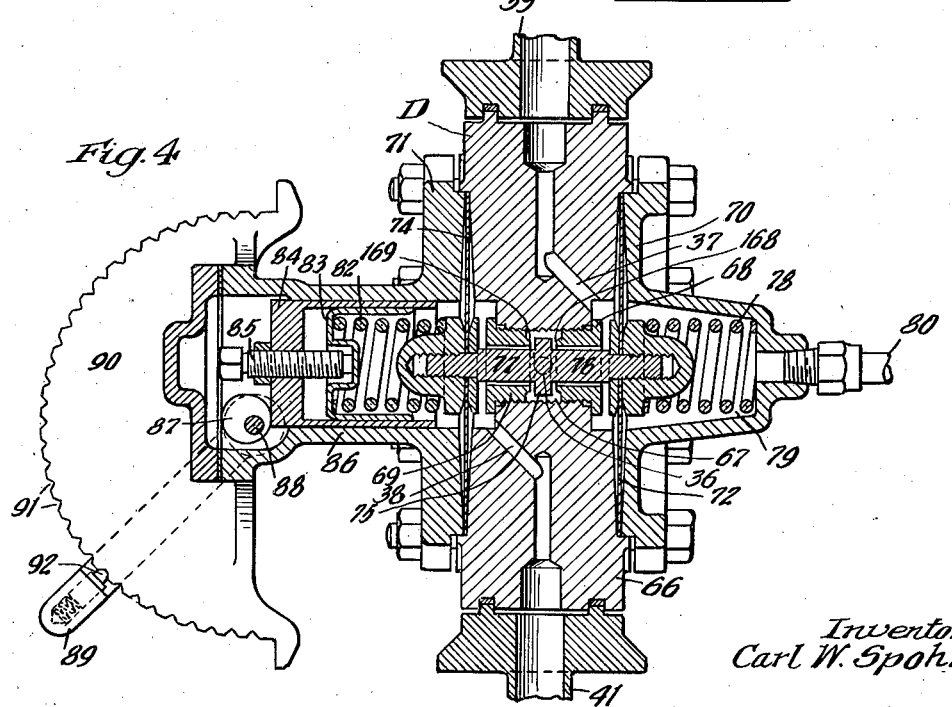
Inventor
Carl W. Spohr
By Joseph Harris
His Atty.

Nov. 24, 1936.  C. W. SPOHR  2,061,856
TEMPERATURE CONTROLLED VEHICLE
Filed Dec. 5, 1932  6 Sheets-Sheet 5
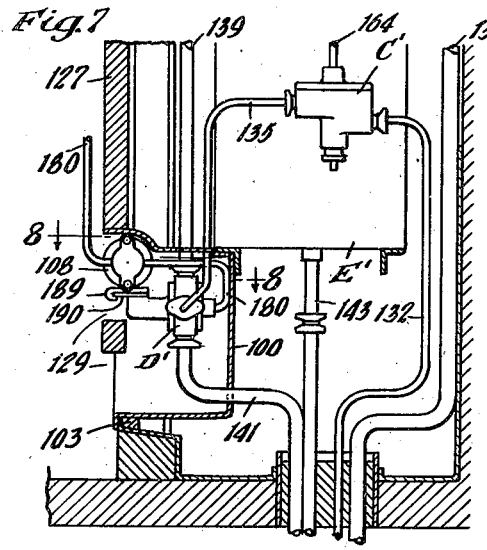
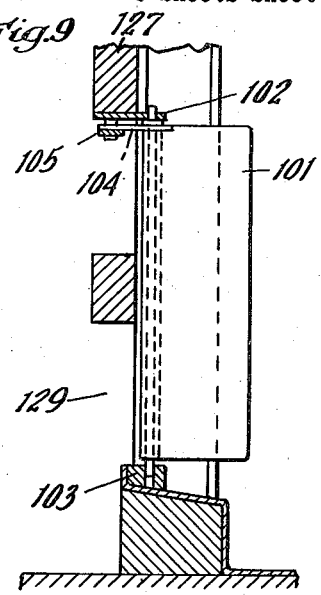
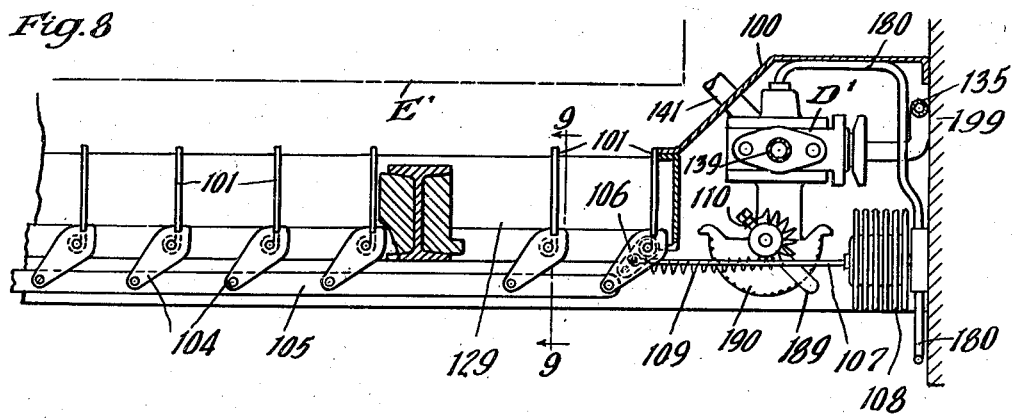
Inventor
Carl W. Spohr
By Joseph Harris
His Atty.

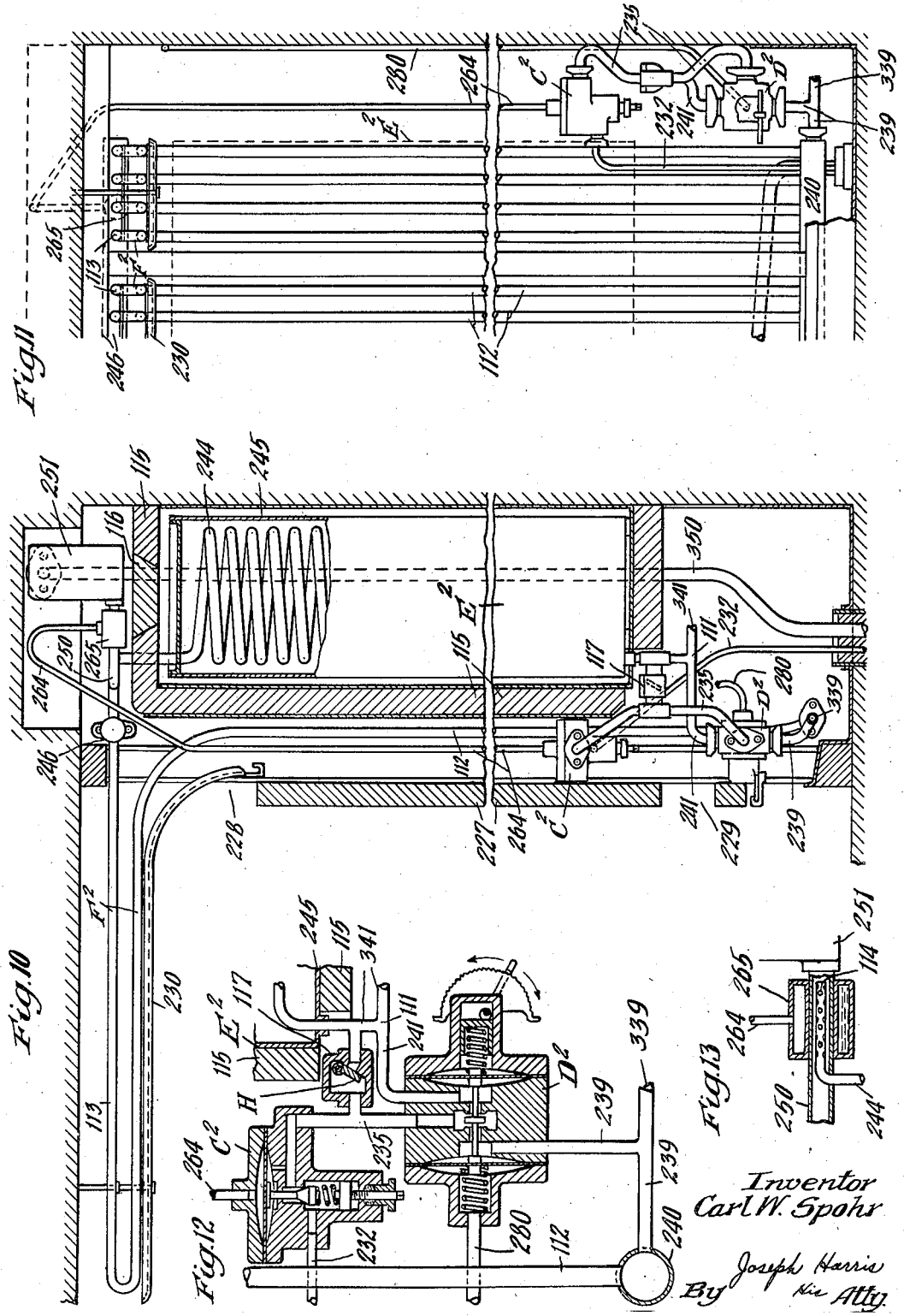

Patented Nov. 24, 1936

2,061,856

UNITED STATES PATENT OFFICE 2,061,856

TEMPERATURE CONTROLLED VEHICLE

Carl W. Spohr, Chicago, Ill., assignor to Mechanical Refrigerated Car Company, Chicago, Ill., a corporation of Illinois Application December 5, 1932, Serial No. 645,697

17 Claims. (Cl. 62—117)

This invention relates to improvements in temperature controlled vehicles and more particularly, but not exclusively, temperature controlled refrigerator cars.

One object of the invention is to provide an efficient and economical cooling system for the revenue-producing or pay load compartment of a vehicle such as a refrigerator car, other type of railway car or truck, and so arranged and operating that the temperature of said compartment will be automatically controlled within predetermined limits under all conditions of operation.

Another object of the invention is to provide a refrigerating or cooling system, wherein the power is derived from movement of the vehicle or power plant of the vehicle, of the compressor-condenser-expander type wherein the cooling or expansion coils for tempering the air of the revenue-producing compartment are combined in such manner with a cold storing or cold accumulating system with thermostatically governed control and distributor valves that the maximum refrigerating or cooling effect, when the vehicle is moving, delivered from the compressor is confined to the revenue-producing compartment coils when cooling of the latter is necessitated to a temperature within the predetermined temperature range or for maintaining the temperature within said range.

Another object of the invention is to provide a refrigerating system for vehicles such that, when the available refrigerating or cooling effect from the compressor, as when the vehicle is stationary or the compressor inactive, is inadequate, cold is delivered to the pay load expansion coils from the cold accumulator and hold over system when cooling of the pay load compartment to a temperature within the predetermined temperature range is necessitated or maintenance of such temperature required.

Another object of the invention is to provide a refrigerating system such that, when the refrigerating effect in excess of that necessary to maintain the pay load compartment within the predetermined temperature limits, is being delivered from the compressor, such excess is stored or accumulated in the cold accumulator system so as to be available when the conditions are changed.

A further object of the invention is to provide a refrigerating system for vehicles of the type indicated in each of the three preceding paragraphs wherein all varying requirements intermediate any of the conditions therein referred to, are automatically provided for by expansion and distributor valves in the system, which valves in turn are governed by the condition of the refrigerant in the system and prevailing temperature of the pay load compartment.

Still another object of the invention is to provide a refrigerating system of the type indicated wherein the complete refrigerating system is comprised of what may be termed two sub-systems, that is, a pay load compartment sub-system and a cold accumulator sub-system, the two sub-systems being so inter-related that, under some conditions, the two sub-systems function normally with respect to the system considered as a whole to effect cooling of the pay load compartment by the pay load compartment sub-system and/or storage of excessive refrigerating capacity in and by the cold accumulator sub-system and, under certain other conditions, the two said sub-systems functionally cooperate to effect a direct interchange or transference of heat units therebetween more or less independently of the system considered as an entirety with automatic provisions for effectively providing for all intermediate conditions.

A specific object of the invention is to provide a refrigerating system for vehicles so arranged that, as the refrigerant is delivered from the receiver and flows into the several pipe coils, it is first controlled by a thermostatically governed expansion valve and second, by a thermostatically governed distributor valve, the position of the latter determining whether all the refrigerant shall pass to the pay load compartment coils; all to the cold accumulator system; or proportionately delivered to both said coils and accumulator system.

Another specific object of the invention is to provide in a refrigerating system of the kind hereinbefore indicated, pipe connections and a check valve so arranged as to permit a reversal of the flow of the refrigerant through the cold accumulator sub-system to permit the coils of the latter to function as a condenser and, by gravity, feed the condensed refrigerant therefrom to the pay load compartment sub-system of coils.

A further specific object of the invention is to provide, ir a refrigerating system of the character indicated, a cold accumulator arrangement with associated control valves such that the coils of the cold accumulator function as expander or evaporating coils under certain conditions or, under other conditions, as condensing coils and feed back the refrigerant to the pay load compartment coils for augmenting the refrigerating capacity of the latter.

Other objects of the invention will more clearly appear from the description and claims hereinafter following.

In the drawings forming a part of this specification, Figure 1 is a diagrammatic or schematic view illustrating the general arrangement or layout of the improved refrigerating system as applied to a refrigerator car. Figure 2 is a longitudinal, vertical sectional view of a refrigerator car showing the improved system or apparatus incorporated therein, only one end of the car being shown and parts being broken away to better accommodate the view on the sheet. Figure 3 is a vertical, transverse, sectional view of the refrigerator car and corresponding substantially to the section line 3—3 of Figure 2. Figure 4 is an enlarged sectional view of the distributor valve employed in the improved apparatus. Figure 5 is an enlarged sectional view of the expansion valve employed. Figure 6 is an enlarged sectional view and part elevation of an improved trap for the refrigerant employed in connection with the compressor adjacent the intake side of the latter. Figure 7 is a view similar to Figure 2 illustrating a modified form of the refrigerating apparatus as associated with louvers at the bulkhead of the refrigerator car. Figure 8 is a horizontal sectional view of the arrangement shown in Figure 7 and corresponding to the line 8—8 thereof. Figure 9 is an enlarged vertical sectional view corresponding substantially to the line 9—9 of Figure 8. Figure 10 is a view similar to Figure 2, illustrating another embodiment of the invention, the cold accumulator tank in this view being shown partly broken away and with the surrounding insulating medium in section. Figure 11 is a part vertical transverse sectional view of the refrigerator car embodying the construction shown in Figure 10, the coils and associated valves being in elevation as would appear when looking from the lefthand side of Figure 10 toward the right and with the bulkhead removed. Figure 12 is a part vertical sectional view, part elevational and more or less schematic view illustrating the arrangement and interrelation of the expansion, check and distributor valves employed in the construction of Figures 10 and 11. And Figure 13 is a detailed sectional view, illustrating the details of construction of thermostatic bulb associated with the suction line and which governs the action of the expansion valve.

Referring first to the apparatus illustrated in Figures 1 to 6 inclusive, the compressor is indicated conventionally by the reference character A; the receiver by B; the expansion valve at C; the distributor valve at D; the two cold accumulators at E—E; the pay load cooling or expansion coils at F—F and the trap adjacent the compressor at G. The compressed refrigerant as delivered from the compressor A through the outlet pipe 20 thereof is initially delivered to condenser coils which it is deemed unnecessary to illustrate. Such condenser coils may be located on the roof of the car as disclosed, for instance, in the Luhr Reissue Patent No. 17,660, reissued May 13, 1930, or in any other desired place with reference to the vehicle, as will be understood by those skilled in the art. As will be further understood, the condensed refrigerant is delivered from such condenser coils to the receiver B through the return pipe 21.

When the refrigerating system or apparatus is employed with a refrigerator car, as illustrated in the drawings, the compressor is preferably driven from one of the car axles, indicated conventionally at 22 in Figure 1, by means of one or more belts 23, taking over a pulley 24 on the axle and an idler pulley 25, belts 26 being run from the idler pulley 25 to a driving pulley 126 on the compressor shaft. The details of this driving arrangement are deemed unnecessary of illustration in the present application since any suitable driving mechanism for the compressor may be employed. For a more complete disclosure of the compressor drive above described and conventionally illustrated in the drawings, reference may be had to my pending application, Serial No. 620,774 filed July 5, 1932, for improvement in temperature controlled vehicles. As will be further understood, the compressor will preferably be mounted in fixed position on the underside of the car body adjacent one of the trucks in any suitable manner, as illustrated in either said Luhr reissue patent or my said co-pending application. Similarly, the receiver B may be located beneath the car floor or, if desired, within one of the bulkhead chambers, the specific location thereof being immaterial so far as the present invention is concerned.

In carrying out the invention as applied to a refrigerator car, each cold accumulator E is preferably located in a bulkhead chamber K at each end of the car, as indicated schematically in Figure 1, but only one of which is illustrated in detail in Figure 2, each such bulkhead chamber being separated from the pay load compartment P of the car by a transverse bulkhead 27 in the usual manner, the bulkhead being of such height as to leave an air admission opening 28 at the top and an air delivery opening 29 at the bottom. Preferably also, the expansion and control valves C and D are located within one of the bulkhead chambers, only one set of such valves C and D being required in the arrangement illustrated. The pay load expansion or cooling coils F are preferably located near the ceiling of the pay load compartment P, moisture condensates thereon being prevented from dripping onto the load by suitable drip pans 30, which convey any such condensates to points adjacent the bulkhead where the same may drip down into the secondary drip pan 31 and allowed to fall from the latter into the bulkhead chamber from the bottom of which the same may be drained to the exterior of the car by any suitable means.

From the receiver B, the refrigerant (which may be ammonia, sulfur dioxide or any other suitable substance having a low boiling point) is first conveyed through the pipe 32 up through the floor of the car to the intake port 33 of the expansion valve C, as best illustrated in Figure 5, and is adapted to be delivered from the latter through the outlet port 34 to the pipe 35 by which it is conducted to the inlet port 36 of the distributor valve D, as best shown in Figure 4. Dependent upon the position of the valve proper in the distributor valve D (as hereinafter described in detail), the refrigerant is delivered to either one or both of the outlet ports 37 and 38 of the distributor valve, port 37 communicating with pipe 39 leading to the header 40 of the expansion coils F, and the outlet port 38 communicating with pipe 41 which leads to a T 42 where the refrigerant is divided and passed by branch pipes 43—43 to the lower ends of the cold accumulator coils 44 in each of the cold accumulator tanks 45, as best illustrated in Figure 3. The refrigerant delivered to the header 40 is distributed through the expansion or cooling coils F and after being expanded and vaporized therein, is delivered to an upper header 46 from which the vaporized refrigerant is conducted by pipe 47 to a junction 48 with the pipes 49—49 running to the top ends of the respective cold accumulator coils 44 at each end of the car. From the junction 48 leads the return or suction pipe 50, having a trap 51 therein at the top of the bulkhead chamber as shown in Figure 2, the suction pipe or line 50 being then extended downwardly through the floor of the car and to the trap G, whence the refrigerant is delivered or drawn into the compressor A through the connecting pipe 52, as hereinafter described, thus completing the circuit of the refrigerant.

Referring now to the expansion valve C, the same comprises a main block 53 having the inlet and outlet ports 33 and 34 above referred to and a communicating passage 54 therebetween, said passage 54 having a valve seat 55 at the bottom thereof with which cooperates a conical valve 56. The latter is normally influenced upwardly by a spring 57 in the cylindrical bore 58, the tension of the spring 57 being adjustable by means of an adjusting screw 59 extended through suitable nut and packing to the exterior of the valve. The valve 56 is provided with a stem 60 secured at its upper end to a diaphragm 61 working in a chamber 62. The underside of the diaphragm 61 is in communication with the outlet port 34 by means of passage 63. The upper side of the diaphragm is in communication, through pipe 64, with the thermostatic bulb 65 (see Figures 1 and 2) which may be of any suitable type but preferably comprises a small casing surrounding the suction line 50 and within which casing is confined a small quantity of refrigerant. With this arrangement, it is evident that the pressure on the upper side of the diaphragm 61 will vary in accordance with the pressure in the bulb and line 65—64, which in turn is dependent upon the condition or characteristics of the refrigerant passing through the suction line 50, that is, when the refrigerant vapor is passing through the suction line 50 in a saturated condition, the same will have a definite temperature corresponding to the prevailing pressure; when the pressure is higher and/or the vapor is superheated, the temperature will be correspondingly higher; and when the pressure is lower and/or the vapor is wet, the temperature will be correspondingly lower. Stated otherwise, as conditions vary in the suction line 50, the pressure on the upper side of the diaphragm 61 of the expansion valve will correspondingly vary so that the expansion valve will be thermostatically responsive to the varying conditions in the circulating system and as the pressure increases, the valve 56 will be farther opened and the refrigerant allowed to pass through the expansion valve in correspondingly greater quantity. By suitably adjusting the tension of the spring 57, it is obvious that the expansion valve may be set to open and close within predetermined limits of temperature range corresponding to the temperature of the refrigerant in the suction line 50.

Considering next the distributor valve D, as illustrated in detail in Figure 4, the same comprises a main block 66 having the inlet port 36 and outlet ports 37 and 38 hereinbefore referred to. Said block has a central opening 67 extending transversely therethrough, the same being threaded and receiving therein at its opposite ends two valve seat nuts 68 and 69, each of the latter in turn being centrally apertured and having a valve seat 168 and 169 respectively at its inner end. Diaphragm chambers are provided on opposite sides of the main block 66 by means of suitable cover plates 70 and 71, bolted or otherwise secured to the main block, there being flexible diaphragms 72 and 74 in the respective diaphragm chambers. Cooperable with the valve seats 168 and 169 is a double ended valve 75 from the opposite sides of which extend stems 76 and 77 secured to the diaphragms 72 and 74 respectively, so that said valve proper is freely adjustable or floating horizontally, as viewed in Figure 4, and adapted to engage one or the other of the valve seats 168 and 169 or assume a position free of both valve seats, as indicated in Figure 4.

On the outer side of the diaphragm 72 is provided a spring 78 disposed in a chamber 79, which is in communication with a pipe 80 that in turn leads to a thermostatic bulb 81 (see Figure 1) that is preferably located in the center of the pay load compartment and responsive to the temperature of the air in said compartment. On the outer side of the diaphragm 74 is provided another spring 82, the outer end of which is seated in a cup-shaped follower 83, the latter in turn being lengthwise adjustable in a cup-shaped sleeve 84. Relative adjustment between the follower 83 and sleeve 84 is effected by an adjusting screw 85, whereby to adjust the tension of the spring 82 relative to the diaphragm 74.

The sleeve 84 is in turn slidable within a bearing extension 86 of the cover plate 71 and, at its outer end, the sleeve 84 is engaged by an eccentric 87 carried by a shaft 88, the outer end of said shaft having a hand lever 89. The bearing extension 86 carries an indicator dial plate 90 concentric with the shaft 88, said plate 90 being notched at regularly spaced intervals, as indicated at 91—91 and with which notches cooperates a spring pressed detent 92, carried by the lever 89.

As will be evident, the pressure on the outer side of the diaphragm 72 will vary in accordance with the temperature in the pay load compartment, such pressure being responsive to temperature changes by reason of the thermostatic bulb 81, which may be of any suitable construction, preferably one containing a small quantity of fluid with a relatively high co-efficient of expansion. By adjusting the screw 85 and hence the tension on the spring 82, for any given setting of the eccentric and lever 87—89, the two springs 82 and 78 may be balanced for a given temperature at the bulb 81 so as to maintain the valve 75 in its intermediate position, as shown in Figure 4. By adjusting the lever 89 angularly with respect to the indicator plate 90, which will be suitably inscribed with scale markings to correspond to different temperatures, it is evident that the eccentric 87 will be correspondingly adjusted and hence effective tension of the spring 82 on the diaphragm 74 correspondingly varied. Hence, the distribution of the refrigerant entering through the port 67 to either or both of the outlet ports 37 and 38 (as more particularly described hereinafter) may be governed for different predetermined ranges of temperature in the pay load compartment by simple manipulation of the lever 89.

Refrigerant passing through the distributor valve through outlet port 38, as previously described, is conducted through pipe 41 and branch pipes 43—43 to the respective cold accumulators E. Each of the latter preferably comprises a tank 45 with an interior coil 44, as best shown in Figure 3. Each tank is adapted to contain a quantity of a suitable congealable liquid, such as sodium chloride, calcium chloride or magnesium chloride and which liquid, for convenience, is hereinafter termed "brine". As will be understood, when the condensed refrigerant is admitted to the bottom of the coil 44 and passes upwardly therethrough, gradually boiling off and vaporizing, there is a transfer of heat units from the brine to the refrigerant, resulting in cooling and ultimate congealing of the brine so that the "cold" is thereby accumulated and rendered available for cooling the pay load compartment, as hereinafter described. In this connection, attention is directed to the fact that the distributor valve occupies a position at a level below that of the bottom of the coils 44, for a purpose hereinafter described.

The cooling or expansion coils F of the pay load compartment are arranged near the ceiling of the car, as hereinbefore described, and extended preferably the full length of the pay load compartment. Each of these coils is in communication with the lower and upper headers 40 and 46, four of such coils being illustrated in Figure 3, and each coil suitably supported from the roof or ceiling of the car by hangers 94—94, it being understood that the refrigerant enters the bottom of each of the individual coils and circulates upwardly therethrough, the vapor being delivered through the header 46 to the return branch 47.

The refrigerant, either superheated, saturated or wet and/or with any entrapped liquid, after passing the thermostatic bulb 65, enters the bottom of the trap 51 and the vapors are drawn off from the top thereof, it being understood that said trap may be of any well known or desired form suitable for the purpose.

Referring next to the trap G, with particular reference to Figures 1 and 6, the same comprises a shell 95 into which the refrigerant returned through the line 50, enters approximately at the middle thereof from the side, as indicated at 151 in Figure 6. At the bottom, the shell 95 communicates with a downwardly extended pipe 96 and at the bottom of the latter is provided a gravity check valve 97. From the opposite side of the valve 97 extends a relatively small capacity expansion coil 98, the upper end of which is adapted to deliver the vaporized refrigerant through the pipe 99 into the shell 95 at a point below the pipe 151. With this construction, as will be evident, any refrigerant in a liquid condition, entering the shell 95 of the trap from the pipe 50, will fall in the shell 95 down through the pipe 96 and, under the influence of gravity, will open the trap 97 and pass into the expansion coil 98 and become vaporized in the latter and delivered as a vapor through the pipe 99 back to the shell 95. In this manner, danger of the refrigerant in a liquefied condition being conducted to the compressor through the pipe 52 is reduced to a minimum with consequent minimization of injury to the compressor.

The operation of the refrigerating apparatus is as follows. The thermostatic valve C is initially so adjusted that the valve proper 56 thereof will remain closed, when the vapor temperature in the suction line 50 corresponds to the pressure in the suction line and evaporating system in a manner that the leaving suction vapors are dry or wet saturated. The distributor valve D is initially so set that, so long as the temperature of the pay load compartment (bulb 81) is within the predetermined permissible temperature range, the valve proper 75 will remain in an intermediate position, permitting distribution of the refrigerant to both of the outlet ports 37 and 38. The adjustment and calibration of the distributor valve D is also such that, when the temperature in the pay load compartment reaches the upper limit of the permissible range, the pressure on the diaphragm 72 will be sufficient to force the valve 75 completely to the left as viewed in Figure 4, thereby shutting off the feed of refrigerant to the cold accumulators and, conversely, when the temperature in the pay load compartment drops to the lower limit of the permissible temperature range, the valve proper 57 will be moved to the fullest extent to the right, closing off passage of the refrigerant to the pay load compartment coils F.

Assuming that both the pay load compartment and the cold accumulators are warm, the valve 75 will be seated on the valve seat 169, preventing passage of the refrigerant to the cold accumulators. With the car in motion and the compressor operating, the pressure in the suction line 50 and evaporating system back to the expansion valve seat 55, will drop while the temperature in the suction line 50 and the bulb 65 stays comparatively high because of the superheat in the vapor in the suction line, resulting in increased pressure in the bulb 65 in which the vapor of the refrigerant is always saturated and hence increased pressure in the line 64 and chamber 62. This results in opening of the expansion valve and admission of the refrigerant to the admission port 36 of the distributor valve. The refrigerant is then passed through the distributor valve D to the outlet port 37 and thence to the cooling or expansion coils F for the pay load compartment. As obvious, the evaporator pressure in these coils is directly proportional to the heat transfer capacity of the coils, which is governed by the temperature of the pay load compartment and hence the vaporized refrigerant, as it leaves these coils, will be saturated or substantially so. As this process continues, the pay load compartment is gradually cooled down until it reaches the upper limit of the permissible temperature range. As the process continues and the pay load temperature drops below the upper limit, the temperature responsive bulb 81 will begin to effect a reduction of pressure behind the diaphragm 72 and consequent initiation of movement of the valve 75 toward the right, as viewed in Figure 4, thus in turn permitting distribution of part of the refrigerant through the outlet port 38 to the cold accumulators. Continued operation in the same manner with gradual lowering of the temperature in the pay load compartment until the lower limit is reached, will result in complete movement of the valve 75 to the right, thus shutting off supply of refrigerant to the coils F and permitting full supply of the refrigerant to the accumulators E. Under this condition, the evaporator pressure in the system is obviously determined by the heat transfer capacity of the several expansion coils, thus insuring saturated vapor at the highest possible pressure passing through the suction line and delivered to the suction side of the compressor.

If another condition be assumed where the brine in the tanks is frozen, the temperature of the pay load compartment above the upper limit of the permissible range and the car stationary, the operation is as follows. Due to the bulkhead arrangement and location of the cold accumulator tanks in the bulkhead chambers, it is evident that there will be air circulation from the pay load compartment through the upper opening 28 at each bulkhead, thence downwardly around and in contact with the tanks and back again to the pay load compartment through the lower openings 29. Such refrigerant as is in the coils F will obviously be evaporated, thus assisting in the cooling. While the temperature of the pay load compartment remains above the upper limit, the distributor valve D will be closed to the cold accumulators and the evaporator pressure in the system will adjust itself to the pay load temperature and be correspondingly high while the temperature in the accumulator coils is at the same time low. This results in the evaporated refrigerant from the coils passing over into the accumulator coils which, together with such refrigerant in vaporized condition then in the accumulator coils, will condense in the accumulator coils so that, in addition to the heat transferred by the air currents to the tanks there is other heat transported or transferred from the pay load compartment into the tanks. This operation will continue until the temperature of the pay load compartment lowers to the upper predetermined temperature limit. As the action continues and the temperature in the pay load compartment drops below the upper limit, the distributor valve will again be actuated so as to open the passage to the outlet port 38, communicating with the accumulator coils. As soon as this occurs, the condensed refrigerant that is collected in the accumulator coils is then free to flow by gravity downwardly through the branch pipes 43 and through the pipe 41 into the distributor valve D and thence to the outlet port 37 whence the refrigerant is delivered to the coils F and free to expand or evaporate therein, thus accelerating the cooling of the pay load compartment, which in turn is again further accelerated by the refrigerant vapors coming off from the coils F and passing over again into the accumulator coils and condensing therein.

A similar action will take place under the conditions indicated in the preceding paragraph where the car is moving slowly and the compressor A is supplying only a portion of the necessary refrigerant capacity for the pay load compartment. In this last named condition, the cooling of the pay load compartment from above down to the upper limit of the temperature range will, of course, be accelerated to the extent of such refrigerant capacity as is supplied by the compressor. Under the conditions just described and those of the preceding paragraph, it is evident that once the supply of refrigerant from the accumulators is reversed and fed to the coils F, the cooling action will be relatively rapid until the temperature of the pay load compartment reaches the lower limit of the predetermined range, at which time the distributor valve D will shut off any further feed of refrigerant to the coils F. Between the conditions described, various other intermediate conditions will develop in accordance with which the distributor valve proper 75 will be actuated in such manner as to admit more or less of the refrigerant through the respective ports and the common evaporator pressure in the system will adjust itself so that the resulting mixture from all the coils will be saturated or substantially so. When the pay load compartment reaches its lower temperature limit and with the brine frozen in the accumulator tanks, the suction pressure will drop to its lowest value, whereupon the thermostatically controlled expansion valve C will remain nearly closed, maintaining an evaporating pressure low enough to evaporate the admitted refrigerant at the low temperature of the frozen brine in the accumulator tanks and sub-cooling them.

From the preceding, it will be seen that all fluctuations in refrigeration demand and compressor output are automatically taken care of; that enough refrigerant is always fed to and through the pay load coils F to maintain the predetermined pay load compartment temperature at the most advantageous evaporator pressure when the total compressor output is sufficient to furnish this amount or the cold accumulators are cold; that with the compressor supplying more refrigerating capacity than required to maintain the pay load compartment within the predetermined range, all such excess refrigerant is diverted to and utilized to congeal the brine in the accumulators; that the vapors leaving the expansion or evaporator coils are saturated or substantially so; and that, in the absence of compressor output or insufficient compressor output and with the brine frozen in the accumulators, the cold stored in the accumulators is utilized directly to replace or augment the compressor output, as the case may be, both by lowering the temperature of circulating air coming in contact with the outsides of the tanks and/or by condensation of the refrigerant in the coils of the accumulators.

Referring next to the form of the invention illustrated in Figures 7, 8 and 9, the bulkhead is indicated at 127, the lower end of the cold accumulator tank at E'; the thermostatic expansion valve at C' and the distributor valve at D'. The pipe 132 is the supply pipe for the refrigerant from the receiver to the expansion valve C'; 164 the pipe leading from the expansion valve C' to the corresponding thermostatic bulb in the suction line (not shown); 135 the pipe from the expansion valve C' to the distributor valve D'; the pipe 141, the supply line from the distributor valve D' to the cold accumulators; 139 the pipe for delivering the refrigerant from the distributor valve D' to the pay load compartment coils (not shown); 143 the inlet branch pipe for the refrigerant to the coil within the tank of the cold accumulator E'; 150 the return or suction pipe leading to the compressor (not shown); and 180 the pipe leading to the thermostatic control bulb located in the pay load compartment similar to the bulb 81, previously described. Insofar as the parts just referred to are concerned, the arrangement corresponds to that of the first described form except that the distributor valve D' is so arranged that the indicator dial 190 thereof is arranged horizontally instead of vertically and correspondingly, the adjustment lever 189 thereof swings in a horizontal plane. Further, the distributor valve D' is disposed within a small compartment defined in part by the car wall 199 and a sheet metal partition 100, located at one end of the lower opening 129 below the bulkhead.

In the arrangement of Figures 7, 8 and 9, the lower opening 129 of the bulkhead chamber is controlled by a series of louvers or valves 101, each of which is pivotally mounted in the upper and lower supports 102—103 extending along the top and bottom edges of said opening 129 so as to adapt the louvers 101 to swing about vertical axes. Each louver is provided with an outwardly and angularly extended arm 104, all of the latter being connected to a common operating link 105. The extreme righthand louver 101, as viewed in Figure 8, has associated therewith a rigid arm 106 to which is pivotally connected a rod 107 in turn having its opposite end secured to a thermostatically operable expansion bellows 108. Connected at one of its ends to said lever or arm 106 is a tension spring 109, the opposite end of which is extended around the hub of the shaft for the lever 189 and secured thereto as indicated at 110. The bulb line or pipe 180 running to the bulb in the pay load compartment and which governs the distributor valve D', is in direct communication with the expansion bellows 108.

The spring 109 is preferably calibrated to accord with the temperature control positions of the lever 189. With the arrangement shown and described, it is evident that the louvers 101 will be controlled synchronously with the control or operation of the distributor valve D' and responsive to temperature conditions in the pay load compartment. When the temperature in said compartment is above the upper limit of the predetermined temperature range, the louvers 101 will be fully open and at the same time, the distributor valve D' will be so set that the refrigerant is being supplied entirely to the cooling or expansion coils in the pay load compartment. At the other extreme, when the temperature in the pay load compartment is at the lower limit of the predetermined temperature range or below, the pressure in the line 180 will drop, the bellows 108 will contract and the louvers 101 close so as to shut off air circulation between the pay load compartment and bulkhead cooling chamber and at the same time, the distributor valve D' will be at its opposite extreme condition where circulation of the refrigerant to the pay load compartment coils is shut off and the refrigerant supplied solely to the cold accumulators. Between these two extremes, it is obvious that the louvers 101 will occupy various intermediate positions, depending upon the conditions set up in the refrigerating system.

Referring next to the construction illustrated in Figures 10, 11 and 12, only one end of the arrangement is shown, it being understood that in connection with this form, the cooling coils as well as the cold accumulators will be duplicated at both ends of the car, although the control of the refrigerating circulation is governed from the single set of valves at one end of the car shown in these figures. In this construction, the bulkhead is shown at 227 with upper and lower openings 228 and 229 to permit air circulation between the pay load compartment and bulkhead chamber. The expansion valve is indicated at C², the distributor valve at D²; the one set of pay load cooling or expansion coils at the corresponding end of the car at F²; and the cold accumulator at E². Refrigerant is supplied to the expansion valve C² through the pipe 232, which communicates with the usual receiver, not deemed necessary of illustration. The expansion valve C² is thermostatically controlled in the same manner as the valve C, heretofore described, through pipe 264, leading to the thermostatic bulb 265 in the suction line as before.

From the expansion valve C², the refrigerant is adapted to be conducted to the distributor valve D² by pipe 235. From the latter, when the distributor valve is correspondingly set, the refrigerant is delivered through the pipe 239 and branch lines 339 to the lower headers 240—240 of the cooling coils F², at the respective ends of the car, as will be clear from inspection of Figure 12. The distributor valve D² is controlled in the same manner as the valve D from a thermostatic bulb in the pay load compartment (not shown) and pipe 280, portions of which are illustrated in Figures 10 and 11.

When the distributor valve is adjusted to feed refrigerant to the cold accumulator tanks, the same is delivered from the distributor valve through the pipe 241 and T 111 and branch lines 341—341 to the respective coils of the cold accumulators, as shown in Figures 10 and 12.

Each of the cooling coils F² is preferably so arranged as to have a series of vertically extending pipes 112 disposed behind the bulkhead 227, and loops 113 extending into the pay load compartment near the ceiling thereof, through the upper bulkhead opening 228, said loops in turn communicating with an upper header 246. Suitable drip pans 230 are preferably provided beneath the loops so as to catch any condensates and allow the same to drip back into the bulkhead chamber. Between said upper header 246 and the bulb 265, the upper end of the accumulator coil 244 is entered into the suction line 250 with a preferably perforated open end, as indicated at 114 in Figure 13 and within the bulb 265, for a purpose hereinafter described. To the right of the bulb 265, as shown in Figure 10, the suction line enters into the bottom of the trap 251 and the suction line is continued from the top of the latter downwardly through the floor of the car, as indicated at 350, it being understood that the two branch suction lines 350 from the two ends of the car will be merged into a common suction line leading to the compressor. Except for such differences as have been pointed out and occasioned by reason of the duplicated coils F² at each end of the car, the parts so far described in Figures 10, 11 and 12 are or may be substantially the same as in the arrangement shown and described with reference to Figures 1 to 6 and it is deemed unnecessary to repeat the details of construction and operation of the expansion and distributor valves.

Referring to Figure 10, it will be noted that each cold accumulator E², in addition to employing an interior coil 244 and brine tank 245, as illustrated in the first described form of the invention, employs a heavy heat insulating casing 115 therearound with a suitable removable top cover 116 to permit access to the tank. With this construction, it is evident that the cold accumulators do not provide any effective cooling or refrigerating action on any air circulating from the pay load compartment to the bulkhead chamber, as in the previously described forms of the invention, all such direct cooling of circulating air being accomplished substantially entirely by the coils F².

In addition to the insulated feature of the cold accumulators just described, a gravity check valve indicated broadly by the reference H is introduced between the line 235 leading between the expansion and distributor valve C² and D², and the branch pipe 241 leading from the distributor valve to the adjacent cold accumulator, as best shown in Figure 12. As shown in said figure, said check valve is in communication with both of said pipes 235 and 341 and the check valve proper 117 thereof is so mounted that it automatically closes when liquid refrigerant is passing from the expansion valve C² to the distributor valve D² to the pipe 235 but will automatically open when there is a reverse or back feed of condensed refrigerant from the accumulator coil 244 and when the distributor valve D² is so set as to prevent feeding of the refrigerant from the valve D² to said coil 244, all for the purpose hereinafter described.

The operation of the arrangement shown in Figures 10, 11 and 12 is as follows. When all of the refrigerating capacity is required for the pay load compartment, the refrigerant will be distributed through the expansion valve C² and distributor valve D² to the coils F² in the same manner as set forth in connection with the first described form, the expansion and distributor valves being controlled in the same manner. Similarly, when the other extreme condition is encountered where no refrigerating capacity is required for the pay load compartment, all of the refrigerant is distributed to the cold accumulators in the manner heretofore set forth. When, however, the compressor is either idle or not delivering sufficient refrigerating capacity to bring down the temperature of the pay load compartment to the desired point, and it is necessary to draw upon the cold stored in the cold accumulators, a circuit for the refrigerant is set up between the coils F² and the cold accumulator coils, wherein the latter function as condensers for the vaporized refrigerant coming over from the tops of the coils F² to the tops of the cold accumulator coils. During this condition, as will be apparent from the detailed description of the distributor valve heretofore given with reference to the first described form of the invention, the distributor valve D² will be so set as to prevent feeding of the refrigerant therefrom to the outlet pipe 241, leading to the cold accumulator coils. However, as the refrigerant condenses within the cold accumulator coils, the same gravitates to the bottom of the coils 244 and is free to feed to and through the check valve H whence it is delivered to the pipe 235 and from the latter to the distributor valve and in turn from the latter through the outlet port thereof which delivers the refrigerant to the pipe 239 and hence to the pay load compartment cooling coils F². Where there is no refrigerating capacity being delivered under these conditions from the compressor, there will obviously thus be formed a completely closed circuit between the coils F² and cold accumulators. Where there is only a partial or insufficient refrigerating capacity supplied by the compressor, the same circuit exists and augments such refrigerating capacity as is delivered by the compressor, thus insuring the maximum heat transference from the pay load compartment to the cold accumulators and rapid cooling of the pay load compartment. When the temperature of the pay load compartment has dropped to the lower permissible limit, a balanced condition will be obtained and either the condensing of the refrigerant in the cold accumulators stopped or carried on only to such extent as may be necessary to maintain the pay load compartment at the desired temperature.

With the insulated cold accumulators, all or substantially all of the cold accumulated therein is made directly available for condensing purposes when this is required, thus effecting the most efficient transference of the heat units. In the first described form, part of the cold stored in the accumulators is utilized by the exposed surfaces of the tanks for cooling the air but the rate of transfer of heat units so used is obviously somewhat less efficient than where extraction of heat is carried on entirely by the condensing process. Further, the arrangement of Figures 10, 11 and 12 is distinguished from the first described form in that there is no back or reverse flow of condensed refrigerant from the cold accumulators through the distributor valve, the refrigerant always being fed to the distributor valve through the same inlet port and discharged therefrom through either of the outlet ports in accordance with the position of the distributor valve proper.

Referring to the detailed construction illustrated in Figure 13, by arranging for the mixture of the vapors delivered from the accumulator coils with that from the coils F² as there shown within the bulb 265, an accurate reflection of the resultant vapor temperature pressure relation of the mixture is obtained. The vapor coming from the coils F² may, under some conditions, be superheated, whereas those coming from the accumulator coils may be wet. By providing for the thorough intermixture of the two supplies of vapor, a saturated vapor with corresponding pressure will be most nearly attained in the suction line with a corresponding more accurate response of the bulb 265, which controls the expansion valve C².

Although what is now considered the preferred manner of carrying out the invention has been shown and described, it will be obvious to those skilled in the art that various changes and modifications may be made without departing from the spirit of the invention. All such changes and modifications are contemplated as come within the scope of the claims appended hereto.

What is claimed is:

1. In a vehicle having a pay load compartment, a refrigerating system for maintaining said compartment within predetermined temperature limits, said system including: a refrigerant compressor, cooling coils and a cold accumulator all in communication with each other; and a thermostatically controlled refrigerant distributor valve in said system located between the delivery side of said compressor on the one hand and said coils and accumulator on the other hand, said valve, depending upon the temperature in said compartment, being actuable to distribute the refrigerant entirely and only to said coils, entirely and only to the accumulator, or to both said coils and accumulator simultaneously.

2. A refrigerating system in accordance with claim 1 wherein the cold accumulator includes an insulated brine tank and coil therewithin.

3. In a refrigerating system of the character described for a vehicle having a pay load compartment and a refrigerating chamber with means providing for air circulation therebetween, the combination with a refrigerant compressor; of a receiver; cooling coils adapted to be freely contacted by air of said compartment; a cold accumulator including a tank and a coil therein, said accumulator being disposed in said chamber; an expansion valve; a distributor valve; pipe connections from the compressor to the receiver, from the receiver to the expansion valve and from the latter to the distributor valve; independent lines of piping from the distributor valve to the cooling coils and accumulator coil, respectively; a common return suction line form all of said coils to the compressor; thermostatically responsive means in said compartment governing the distributor valve to feed the refrigerant through said cooling coils, to the accumulator coil or both; and temperature responsive means associated with and governed by the temperature of the refrigerant in the suction piping controlling said expansion valve.

4. A refrigerating system in accordance with claim 3 wherein the accumulator tank is heat insulated and the coil therein is adapted to function as a condenser.

5. A refrigerating system in accordance with claim 3 wherein the lower end of said tank coil is disposed at a higher level than the distributor valve and refrigerant condensing in said accumulator coil is adapted to feed by gravity to said distributor valve and from the latter fed to the cooling coils.

6. A refrigerating system in accordance with claim 3 having means providing communication between the inlet pipe of the distributor valve and the outlet pipe therefrom leading to the accumulator coil, said means having a check valve included therein.

7. A refrigerating system for a vehicle having a pay load compartment, said system including: cooling coils in said compartment; a cold accumulator including a tank and a coil therein; a thermostatically controlled expansion valve; a distributor valve; a refrigerant compressor and means for delivering refrigerant therefrom to the expansion valve and from the latter to the distributor valve, said distributor valve having two outlet ports; means for conducting refrigerant from one of said outlet ports to said cooling coils; means for conducting refrigerant from the other outlet port to the accumulator coil; means for heat insulating said tank, the lower end of the coil therein being disposed above the level of the distributor valve whereby, when the accumulator functions as a condenser, the condensed refrigerant flows by gravity from said tank coil to the distributor valve; a return suction line to the compressor, the latter being in separate communication with the upper ends of both said cooling and tank coils; and temperature responsive means governing said distributor valve.

8. In a refrigerating system for a vehicle having a pay load compartment, the combination with a refrigerant compressor having an outlet pipe for delivering refrigerant to a receiver; a return suction line to the compressor; a distributor valve; means for supplying the refrigerant from the receiver to said distributor valve; separate lines of piping arranged in parallel between said distributor valve and suction line, one of said lines of piping having cooling coils included therein adapted for contacting the air of the pay load compartment and the other line of piping having a cold accumulator coil included therein; and means, responsive to the temperature of the pay load compartment, for actuating said distributor valve to feed the refrigerant therefrom to and through the cooling coils direct to the suction line, entirely therefrom to and through said accumulator coil direct to the suction line, or partly through both sets of coils in parallel.

9. A refrigerating system in accordance with claim 8 wherein the distributor valve is disposed at a lower level than said accumulator coil whereby, when the required amount of refrigeration for said compartment is in excess of that supplied by the compressor, a substantially closed circuit is provided for the refrigerant by said two parallel sets of piping and the accumulator coil functions as a condensing coil to feed refrigerant by gravity to the distributor valve.

10. In a refrigerating system for vehicles, the combination with a refrigerant compressor operated by movement of the vehicle; of a receiver to which the refrigerant is delivered from the compressor; an expansion valve in communication with the receiver; a distributor valve having an inlet and two outlet ports, the inlet port being in communication with the expansion valve; a return suction line to the compressor; a cooling coil having its inlet end communicating with one of said delivery ports of the distributor valve and its outlet end in communication with the suction line; a cold accumulator having a coil therein, the inlet end of the latter communicating with the other outlet port of the distributor valve and its outlet end in communication with the suction line; a branch pipe line from a point intermediate the distributor valve and inlet end of the accumulator coil to a point intermediate the expansion and distributor valves, said branch line having a check valve included therein so arranged as to permit delivery of condensed refrigerant from the accumulator coil to the distributor valve.

11. A refrigerating system as set forth in claim 10 wherein the distributor valve is thermostatically governed and the expansion valve thermostatically governed by conditions in said suction line.

12. A refrigerating system in accordance with claim 10 wherein said cold accumulator includes a heat insulated brine tank.

13. A refrigerating system for a refrigerator car having a pay load compartment and a refrigerating chamber separated by a bulkhead with means providing air circulation therebetween, said system comprising an axle driven refrigerant compressor; a thermostatically governed distributor valve; means for supplying refrigerant from the compressor to said valve; a return suction line to the compressor; independent lines of piping arranged in parallel between said distributor valve and suction line, one of said lines of piping having included therein cooling coils disposed in the pay load compartment, the other line of piping having included therein a coil disposed within a brine tank located within the refrigerating chamber, said distributor valve including a valve proper adjustable to positions wherein all of the refrigerant is fed to either of said lines of piping or part to both of the lines of piping, simultaneously.

14. A refrigerating system in accordance with claim 13 wherein said tank is heat insulated.

15. In a refrigerator car having a pay load compartment and an end chamber separated therefrom by a bulkhead, the bulkhead having openings therethrough for circulation of air, the combination with an axle driven refrigerant compressor; of a distributor valve; means for conducting the refrigerant from the compressor to the distributor valve, a return suction line to the compressor; two separate lines of piping between the distributor valve and suction line, one of said lines of piping having included therein cooling coils in the pay load compartment and the other a coil in a cold accumulator disposed in the end chamber; means controlling circulation of air through one of said bulkhead openings; and means, thermostatically controlled, common to both said distributor valve and opening controlling means for governing the same.

16. A refrigerating system for vehicles including: a compressor and distributor valve in communication therewith; a return suction line; a sub-cooling system and a sub-cold accumulator system arranged in parallel between said distributor valve and the suction line; an expansion valve included in the connections between the compressor and distributor valve; and thermostatically governed means controlling the action of said expansion valve, said means including a bulb surrounding the suction line, and a perforated open ended delivery pipe from the sub-cold accumulator system within the suction line adjacent said bulb.

17. In a refrigerator car having a pay load compartment and an end chamber separated therefrom by a bulk head, the combination of an axle driven refrigerant compressor, a distributor valve in communication with the delivery side of the compressor; cooling coils disposed at the top of the pay load compartment, said cooling coils being extended partly within said chamber behind the bulk head; a cold accumulator including a brine tank and coil therein within said chamber, said tank being surrounded with heat insulation; a return suction line leading to the compressor; separate connections from said distributor valve to the intake end of said cooling coils and cold accumulator coil, respectively; a direct pipe connection from the outlet ends of said cooling coils to said suction line; and a direct and separate pipe connection from the cold accumulator coil to said suction line whereby the refrigerant may be passed in parallel circuits through the cooling and accumulator coils from the distributor valve to the suction line.

CARL W. SPOHR.